(12) United States Patent
Dougherty

(10) Patent No.: US 8,569,994 B2
(45) Date of Patent: Oct. 29, 2013

(54) CHARGING DEVICE, SYSTEM, AND METHOD OF SUPPLYING POWER TO AT LEAST ONE LOAD

(75) Inventor: John James Dougherty, Collegeville, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/048,708

(22) Filed: Mar. 15, 2011

(65) Prior Publication Data

US 2012/0049795 A1    Mar. 1, 2012

(51) Int. Cl.
*H02J 7/00* (2006.01)
*B60K 6/20* (2007.10)
*G05F 1/70* (2006.01)
*H02J 1/10* (2006.01)

(52) U.S. Cl.
USPC ........... 320/109; 320/104; 320/111; 320/116; 320/139; 180/65.21; 323/205; 323/207; 307/18; 307/22

(58) Field of Classification Search
USPC ......................................................... 320/109
See application file for complete search history.

(56) References Cited

U.S. PATENT DOCUMENTS

| | | | |
|---|---|---|---|
| 5,157,319 A | 10/1992 | Klontz et al. | |
| 5,225,712 A * | 7/1993 | Erdman | 290/44 |
| 5,341,083 A | 8/1994 | Klontz et al. | |
| 5,341,280 A | 8/1994 | Divan et al. | |
| 5,535,113 A | 7/1996 | Konishi | |
| 5,596,492 A * | 1/1997 | Divan et al. | 363/95 |
| 5,648,894 A | 7/1997 | DeDoncker et al. | |
| 5,986,907 A | 11/1999 | Limpaecher | |
| 6,731,522 B2 * | 5/2004 | Kawazoe et al. | 363/37 |
| 7,880,430 B2 * | 2/2011 | Gale et al. | 320/109 |
| 2007/0080666 A1 * | 4/2007 | Ritter et al. | 320/128 |
| 2008/0218121 A1 * | 9/2008 | Gale et al. | 320/109 |
| 2008/0290845 A1 * | 11/2008 | Holveck et al. | 323/214 |
| 2009/0027002 A1 * | 1/2009 | Stahlkopf | 320/101 |
| 2010/0013438 A1 * | 1/2010 | Anwar et al. | 320/138 |
| 2010/0076612 A1 | 3/2010 | Robertson | |
| 2010/0208501 A1 | 8/2010 | Matan et al. | |

(Continued)

OTHER PUBLICATIONS

Patricio Flores, Juan Dixon, Micah Ortuzar, Rodrigo Carmi, Pablo Barriuso, Luis Moran, Static Var Compensator and Active Power Filter With Power Injection Capability, Using 27-Level Inverters and Photovoltaic Cells, IEEE Transactions on Industrial Electronics, vol. 56, No. 1, Jan. 2009.

(Continued)

*Primary Examiner* — Drew A Dunn
*Assistant Examiner* — Nathaniel Pelton
(74) *Attorney, Agent, or Firm* — General Electric Company

(57) ABSTRACT

A charging device includes a power conditioning device configured to be coupled to an electric power source by an electrical distribution bus. The power conditioning device is further configured to receive alternating current (AC) volt-amperes from the electric power source, convert a first amount of the AC volt-amperes received into direct current (DC) power, and supply the DC power to at least one load. The charging device also includes a controller coupled to the power conditioning device. The controller is configured to determine a second amount of volt-amperes that the charging device has a capacity to supply in addition to the DC power supplied, and control the power conditioning device to supply volt-amperes reactive to the electrical distribution bus using at least a portion of the second amount of volt-amperes.

19 Claims, 4 Drawing Sheets

(56) References Cited

U.S. PATENT DOCUMENTS

2010/0259218 A1  10/2010  Gale et al.
2011/0227534 A1*  9/2011  Mitsutani .................. 320/109
2011/0302432 A1*  12/2011  Harris et al. ................ 713/320

OTHER PUBLICATIONS

Search Report and Written Opinion from corresponding EP Application No. 12159147, Jun. 29, 2012.

* cited by examiner

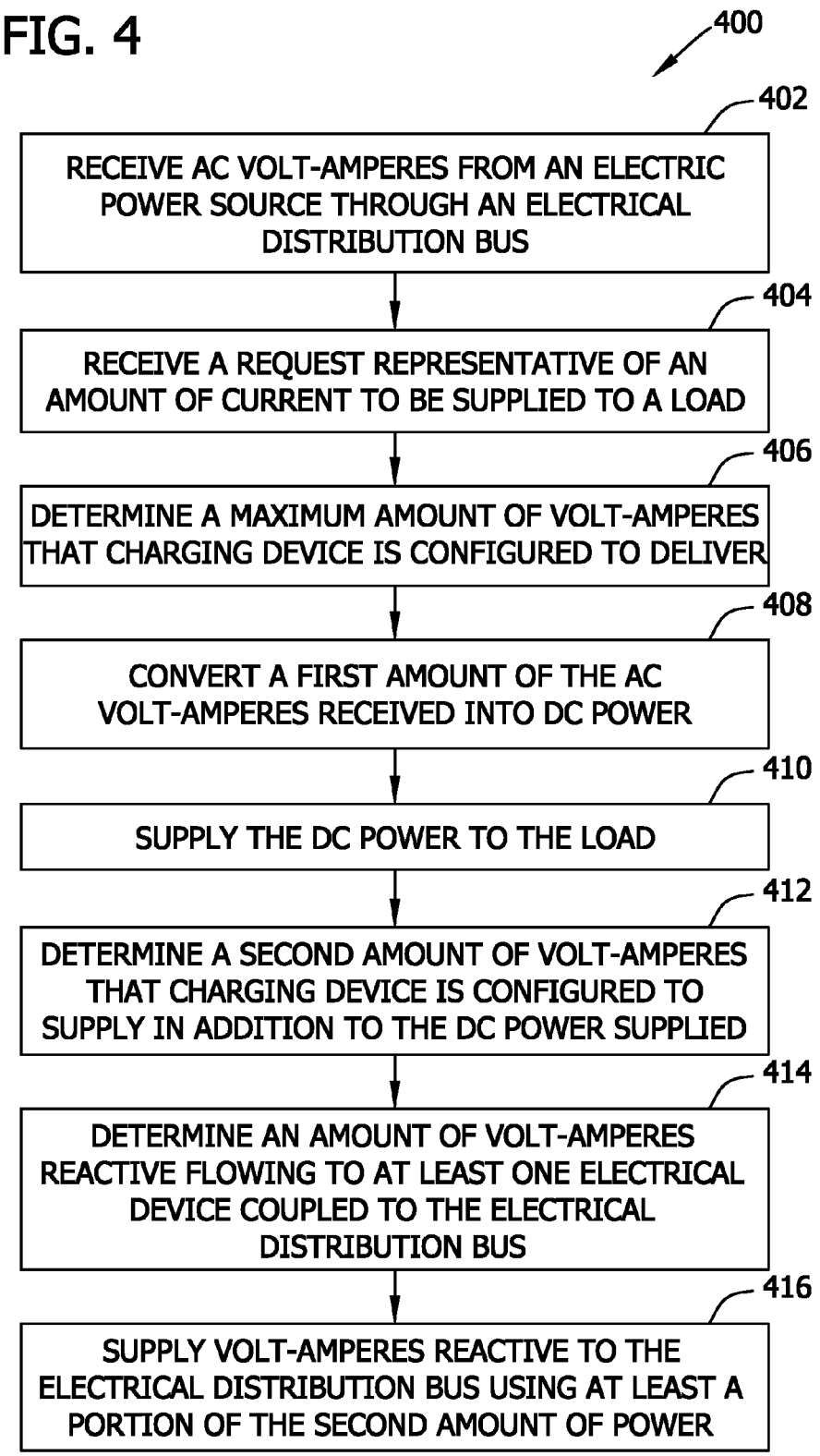

US 8,569,994 B2

CHARGING DEVICE, SYSTEM, AND METHOD OF SUPPLYING POWER TO AT LEAST ONE LOAD

BACKGROUND OF THE INVENTION

The present application relates generally to charging devices and, more particularly, to a charging device, a system, and a method of supplying power to at least one load.

As electric vehicles and/or hybrid electric vehicles have gained popularity, an associated need to manage delivery of electrical energy to such vehicles has increased. In addition, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable.

At least some electric utility distribution networks include a plurality of inductive electrical loads. Most of the volt-amperes supplied by the electric utility are absorbed in loads as electrical power. One or more inductive components within the loads require volt-amperes reactive or VARs to be supplied. The volt-amperes reactive cause an increase in the total volt-amperes supplied by the utility. The volt-amperes reactive current supplied, though reactive and non-dissipative at the loads, expends real power as heat energy within one or more conductors of the electric utility distribution network and no real work is accomplished by the volt-amperes reactive. Such volt-amperes reactive consumption reduces an efficiency of the electric utility distribution network and requires the production of additional volt-amperes (VA) to provide a sufficient amount of real power to the loads.

BRIEF DESCRIPTION OF THE INVENTION

In one embodiment, a charging device is provided that includes a power conditioning device configured to be coupled to an electric power source by an electrical distribution bus. The power conditioning device is further configured to receive alternating current (AC) volt-amperes from the electric power source, convert a first amount of the AC volt-amperes received into direct current (DC) power, and supply the DC power to at least one load. The charging device also includes a controller coupled to the power conditioning device. The controller is configured to determine a second amount of volt-ampere capacity that the charging device has a capacity to supply in addition to the DC power supplied, and control the power conditioning device to supply volt-amperes reactive to the electrical distribution bus using at least a portion of the second amount of volt-ampere capacity.

In another embodiment, a system for supplying power to at least one load is provided that includes a power measurement device configured to measure at least one characteristic of electricity transmitted within an electrical distribution bus. The system also includes a charging device coupled to the power measurement device, and the charging device includes a power conditioning device configured to be coupled to an electric power source by the electrical distribution bus. The power conditioning device is further configured to receive alternating current (AC) volt-amperes from the electric power source, convert a first amount of the AC volt-amperes received into direct current (DC) power, and supply the DC power to at least one load. The charging device also includes a controller coupled to the power conditioning device. The controller is configured to determine a second amount of volt-ampere capacity that the charging device has a capacity to supply in addition to the DC power supplied, and control the power conditioning device to supply volt-amperes reactive to the electrical distribution bus using at least a portion of the second amount of volt-ampere capacity.

In yet another embodiment, a method of supplying power to at least one load is provided that includes receiving alternating current (AC) volt-amperes from an electric power source through an electrical distribution bus, converting a first amount of the AC volt-amperes received into direct current (DC) power, and supplying the DC power to at least one load. The method also includes determining a second amount of volt-ampere capacity that is capable of being supplied in addition to the DC power supplied, and supplying volt-amperes reactive to the electrical distribution bus using at least a portion of the second amount of power.

BRIEF DESCRIPTION OF THE DRAWINGS

FIG. 4 is a flow diagram of an exemplary method of supplying power to at least one load that may be used with the system shown in FIG. 1.

DETAILED DESCRIPTION OF THE INVENTION

Figure 1:
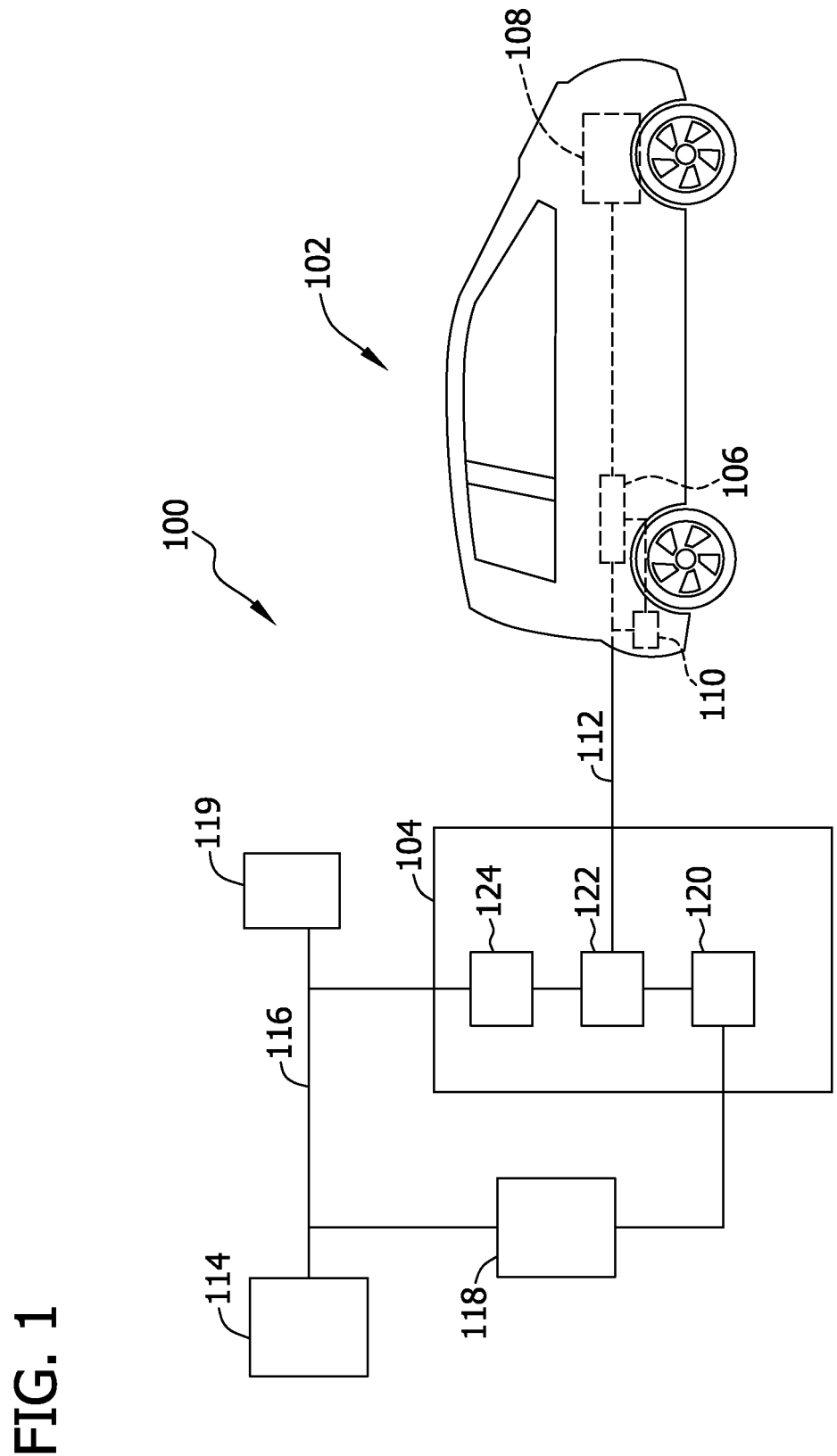
FIG. 1 is a block diagram of an exemplary system for charging an electric vehicle.

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

The embodiments described herein provide a charging device for use in supplying electrical energy to a first load, such as a power storage device of an electric vehicle. The charging device is coupled to an electrical distribution bus, for example, of a utility power grid. An electric power source is coupled to the electrical distribution bus and supplies electrical power, such as volt-amperes, to the charging device. The charging device receives alternating current (AC) volt-amperes from the electric power source and converts the volt-amperes to direct current (DC) power for use in supplying DC power to the power storage device. A second load that includes at least one inductive device is also coupled to the electrical distribution bus. The inductive devices or elements within the second load require the electric power source to supply volt-amperes reactive to the second load through the electrical distribution bus. As a result, a power factor of the electrical energy supplied by the electric power source is reduced.

To increase the power factor and/or to compensate for the volt-amperes reactive required by the second load, the charging device uses excess volt-ampere capacity to supply volt-amperes reactive to the electrical distribution bus. More specifically, the charging device determines an amount of volt-amperes required to supply DC power to the power storage device in an amount requested by the electric vehicle. If the charging device has a volt-ampere capacity in excess of the DC power supplied to the power storage device, the charging device uses at least a portion of the excess volt-ampere capacity to supply volt-amperes reactive to the electrical distribution bus and/or to the second load. More specifically, the charging device determines the amount of volt-amperes reactive required by the second load and/or an amount of volt-amperes reactive required to increase the power factor to a power factor of about 1.0 (i.e., a unity power factor). If the excess volt-ampere capacity of the charging device is equal to or greater than the volt-amperes reactive required, the charging device supplies the required amount of volt-amperes reactive to the electrical distribution bus and/or to the second load. If the excess volt-ampere capacity of the charging device is less than the volt-amperes reactive required, the charging device supplies volt-amperes reactive to the electrical distribution bus and/or to the second load in an amount equal to the excess volt-ampere capacity. Accordingly, the charging device facilitates enabling a power system to supply DC power to a power storage device of an electric vehicle while maintaining a unity power factor and/or compensating for volt-amperes reactive required to be supplied to a second load that is remote from the power storage device.

FIG. 1 illustrates an exemplary system 100 for use in charging, or providing electricity to, at least one load 102, such as an electric vehicle 102. In an exemplary embodiment, system 100 includes a charging device 104 coupled to electric vehicle 102. In an exemplary embodiment, electric vehicle 102 includes at least one power storage device 106, such as a battery and/or any other storage device, coupled to a motor 108. Electric vehicle 102 also includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In an exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein.

In an exemplary embodiment, charging device 104 is coupled to an electric power source 114, such as a generator, a battery, and/or any other device or system that provides electricity to charging device 104 by an electrical distribution bus 116. In an exemplary embodiment, electrical distribution bus 116 is a three-phase bus, such as a portion of an electric power grid of a utility company, providing alternating current (AC) volt-amperes (i.e., AC current and voltage) to charging device 104. Alternatively, electrical distribution bus 116 may include any number of phases of AC volt-amperes to charging device 104.

A power measurement device 118, in an exemplary embodiment, is coupled to electrical distribution bus 116. Power measurement device 118 measures one or more characteristics of electrical distribution bus 116 and transmits data representative of the measurements to charging device 104. More specifically, in an exemplary embodiment, power measurement device 118 measures a voltage, a current, a phase angle, and/or any other characteristic of each phase of electrical distribution bus 116. In addition, power measurement device 118 measures and/or calculates a real power (i.e., volt-amperes) and volt-amperes reactive of electrical distribution bus 116, including a phase shift of a current and/or a voltage of electrical distribution bus 116 as a result of volt-amperes reactive required and/or generated within bus 116. In an exemplary embodiment, power measurement device 118 transmits data representative of the measurements to charging device 104.

Additionally, in an exemplary embodiment, a second load 119 is coupled to electrical distribution bus 116 at a location remote from electric vehicle 102 and power storage device 106. Load 119 includes at least one electrical device that operates at least partially by electromagnetic induction such that volt-amperes reactive are required to be supplied to load 119, for example, by electric power source 114. Load 119 may include, without limitation, an induction motor, a compressor, a fan, and/or any other device that operates at least partially using electromagnetic induction. In an exemplary embodiment, charging device 104 provides volt-amperes reactive to electrical distribution bus 116 to offset or compensate for at least a portion of volt-amperes reactive that may be required within electrical distribution bus 116, for example, as a result of load 119 and/or any other inductive electrical devices or components (not shown) coupled to bus 116.

In an exemplary embodiment, charging device 104 includes a controller 120, a power conditioning device 122, and a protection device 124. Controller 120 is coupled to power measurement device 118 and receives the measurement data from device 118. In an exemplary embodiment, controller 120 includes at least one processor and at least one memory device (neither shown). The processor includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory device includes a computer readable medium, such as, without limitation, random access memory (RAM), flash memory, a hard disk drive, a solid state drive, a diskette, a flash drive, a compact disc, a digital video disc, and/or any suitable device that enables the processor to store, retrieve, and/or execute instructions and/or data.

In an exemplary embodiment, controller 120 receives a direct current (DC) charging request from vehicle controller 110 representative of a demanded charging current for use in charging power storage device 106 (hereinafter referred to as a "DC demand"). Controller 120 determines a commanded DC current (hereinafter referred to as a "DC command") based on the DC demand and/or based on the measurement data (i.e., based on the DC real power required) and transmits data representative of the DC command to power conditioning device 122.

Power conditioning device 122, in an exemplary embodiment, receives volt-amperes from electric power source 114 through protection device 124. Power conditioning device 122 adjusts at least one characteristic of the volt-amperes received from electric power source 114 based on the DC command. In an exemplary embodiment, power conditioning device 122 converts the AC volt-amperes received from electric power source 114 to DC power having a current amplitude based on the DC command. In one embodiment, power conditioning device 122 may receive varying DC command levels during a conversion cycle, for example, as power storage device 106 reaches a full charge. As the DC command level reduces below a volt-ampere capacity of the power conditioning device 122, the device can apply excess capacity (i.e., volt-ampere capacity that is not converted to DC power for transmission to power storage device 106) to generate volt-amperes reactive to offset volt-amperes reactive required by other loads, such as load 119, on the electrical distribution bus 116. Power conditioning device 122 provides DC charging current to power storage device 106 and provides the volt-amperes reactive to electrical distribution bus 116, thus reducing the volt-amperes reactive required to be supplied from the electric power source 114 to facilitate maintaining a unity power factor, i.e., a power factor of about 1.0. Alternatively, power conditioning device 122 may be operated to maintain any other power factor as desired.

In an exemplary embodiment, protection device 124 electrically isolates or disconnects charging device 104 from electric distribution bus 116 if the current received from electrical distribution bus 116 exceeds a predetermined threshold or current limit. In an exemplary embodiment, protection device 124 is a circuit breaker. Alternatively, protection device 124 may be a fuse, a relay, and/or any other device that enables protection device 124 to function as described herein.

During operation, in an exemplary embodiment, a user couples power storage device 106 to charging device 104 with power conduit 112. The user may access a user interface (not shown) of charging device 104 to enter information, such as payment information, and/or to initiate power delivery to power storage device 106. Charging device 104 receives power from electric power source 114 and provides the power to power storage device 106 through power conduit 112. Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106. It should be recognized that at this point, power conditioning device 122 can apply the full volt-ampere capacity to offsetting volt-amperes reactive within electrical distribution bus 116.

Figure 2:
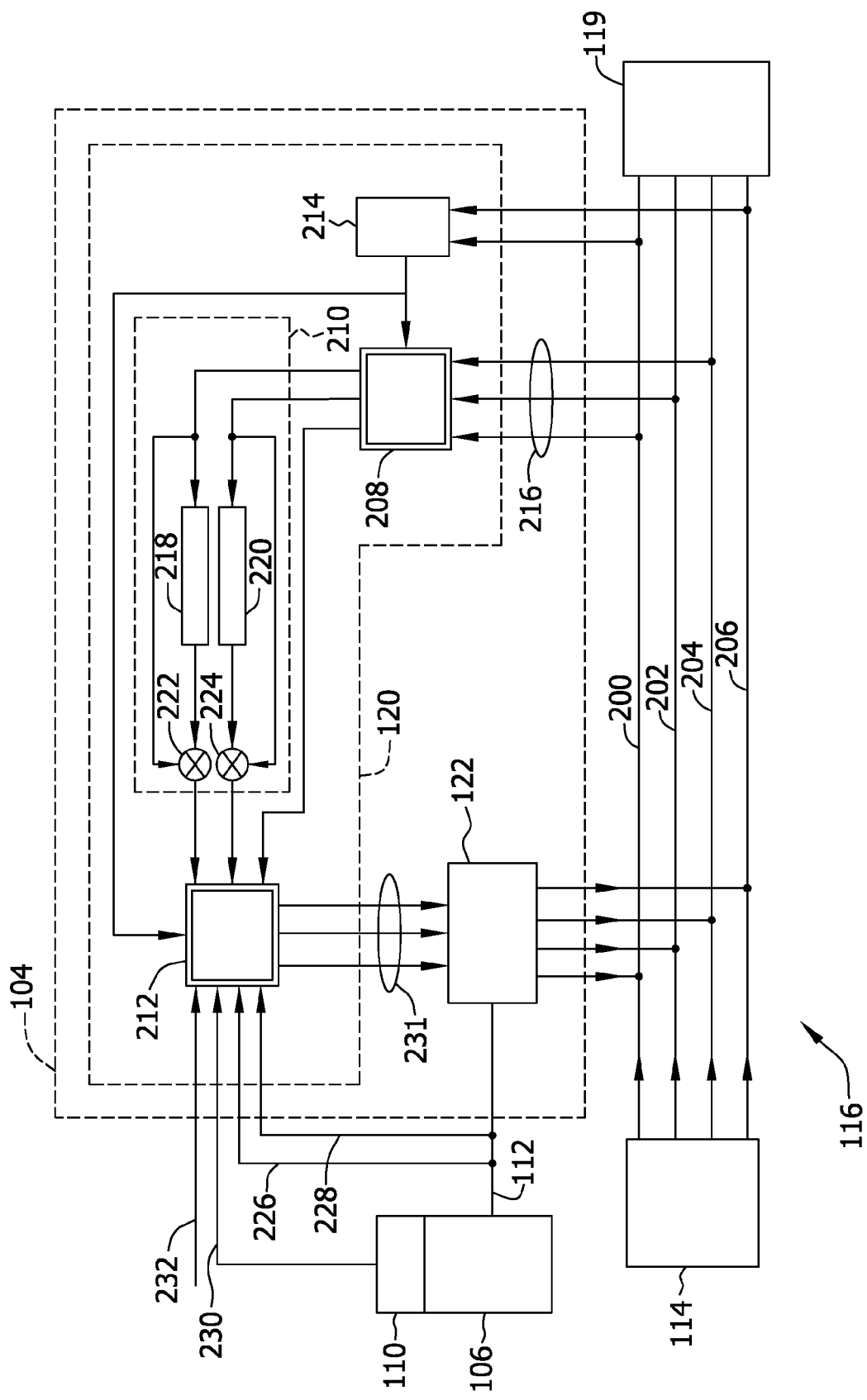
FIG. 2 is a schematic diagram of a portion of an exemplary charging device that may be used with the system shown in FIG. 1.

FIG. 2 is a schematic diagram of a portion of an exemplary charging device 104 that may be used with system 100 (shown in FIG. 1). In an exemplary embodiment, charging device 104 is coupled to electrical distribution bus 116 that distributes electrical volt-amperes received from electric power source 114. In an exemplary embodiment, electrical distribution bus 116 includes a first phase conductor 200, a second phase conductor 202, a third phase conductor 204, and a neutral conductor 206. Electric power source 114 provides a first phase current through first phase conductor 200, a second phase current through second phase conductor 202, and a third phase current through third phase conductor 204. In an exemplary embodiment, substantially no net amount of current flows through neutral conductor 206.

In an exemplary embodiment, as described more fully herein, power conditioning device 122 is coupled to electrical distribution bus 116 and provides one or more compensating currents to electrical distribution bus 116. More specifically, power conditioning device 122 provides current to first phase conductor 200, second phase conductor 202, third phase conductor 204, and/or neutral conductor 206 at determined phase angles and/or amplitudes to provide volt-amperes reactive to offset or compensate for volt-amperes reactive used within electrical distribution bus 116. In one embodiment, power conditioning device 122 provides current to first phase conductor 200, second phase conductor 202, third phase conductor 204, and/or neutral conductor 206 at determined phase angles and/or amplitudes to offset reactive currents and/or dampen harmonic frequency components present within electrical distribution bus 116. Accordingly, in an exemplary embodiment, power conditioning device 122 provides "out-of-phase" power factor correction (i.e., providing compensating volt-amperes reactive) to electrical distribution bus 116 and/or to second load 119.

Controller 120, in an exemplary embodiment, includes a first conversion device 208, a fundamental component filter 210, a second conversion device 212, and a phase locked loop (PLL) 214. First conversion device 208 receives a current signal 216 from each of first phase conductor 200, second phase conductor 202, and third phase conductor 204 and transforms current signals 216 from a stationary reference frame into a reference frame synchronous with the frequency of electric power source 114. In one embodiment, controller 120 and/or first conversion device 208 calculates (or receives signals representative of) a voltage across first phase conductor 200, second phase conductor 202, third phase conductor 204, and/or neutral conductor 206. In an exemplary embodiment, first conversion device 208 performs a "d-q-n" transformation, as is known in the art, that generates a "d" current component, a "q" current component, and an "n" current component from current signals 216 received from electrical distribution bus 116. PLL 214 provides a frequency reference signal and a phase reference signal to first conversion device 208 to synchronize the transformation of current signals 216 with the frequency and phase of electric power source 114.

In an exemplary embodiment, the d current component is transmitted to fundamental component filter 210 that includes a first low-pass filter 218 and a second low-pass filter 220. First low-pass filter averages each value of the d current component with previously received d current component values. A first summing junction 222 subtracts the averaged values from the d current component values to remove any DC components from the d current component. In a similar manner, the q current component is transmitted to second low-pass filter 220 that averages the values of the q current component with previously received q current component values. A second summing junction 224 subtracts the averaged values from the q current component values to remove any DC components from the q current component. The resulting vectors output from first summing junction 222 (hereinafter referred to as "first compensation vectors") and the resulting vectors output from second summing junction 224 (hereinafter referred to as "second compensation vectors") are representative of compensating currents to be provided to electrical distribution bus 116 to compensate for volt-amperes reactive required (i.e., a current and/or voltage phase shift that may occur due to one or more inductive devices (not shown) coupled to electrical distribution bus 116) and/or harmonic frequency components within bus 116. The first compensation vectors and the second compensation vectors are transmitted to second conversion device 212. Second conversion device 212 receives the n current component from first conversion device 208 and the frequency and phase reference signals from PLL 214.

Controller 120 and/or second conversion device 212, in an exemplary embodiment, receives a DC current signal 226 and a DC voltage signal 228 representative of a DC current and a DC voltage, respectively, of power conduit 112. In an exemplary embodiment, DC current signal 226 and DC voltage signal 228 are received from a current sensor and a voltage sensor (neither shown) coupled to power conduit 112. Alternatively, controller 120 and/or second conversion device 212 receives DC current signal 226 and/or DC voltage signal 228 from any other device that enables charging device 104 to function as described herein. Controller 120 and/or second conversion device 212 receives a DC demand signal 230 from vehicle controller 110 representative of a desired or demanded charging current to be provided to power storage device 106 by charging device 104. In an exemplary embodiment, DC demand signal 230 is transformed into representative d, q, and n vectors that are representative of an amount of DC current demanded by vehicle controller 110 (hereinafter referred to as a "DC current demand vector"). The DC current demand vector is transmitted to second conversion device 212. Alternatively, the DC current demand vector is generated within second conversion device 212 from DC demand signal 230.

In an exemplary embodiment, controller 120 is programmed with a maximum or predetermined volt-ampere capacity of charging device 104 and/or power conditioning device 122. The volt-ampere capacity represents a rated amount of volt-amperes that charging device 104 and/or power conditioning device 122 is configured or designed to supply to devices, circuits, or components coupled to charging device 104, such as power storage device 106 and electrical distribution bus 116. Second conversion device 212 determines an amount of excess volt-ampere capacity of charging device 104 and/or power conditioning device 122 based on the DC current demand vector. More specifically, second conversion device 212 subtracts the amount of real power required to supply the current represented by the DC current demand vector (hereinafter referred to as the "real power demand") from the volt-ampere capacity of charging device 104 to determine the excess volt-ampere capacity. If the real power demand is equal to or greater than the volt-ampere capacity of charging device 104, the excess volt-ampere capacity is set to zero and the real power demand is limited to the volt-ampere capacity of device 104 and the DC current demand vector is reduced accordingly. The excess volt-ampere capacity, if any, is available to be used for compensation purposes (i.e., to be provided to electrical distribution bus 116 as volt-amperes reactive and/or to reduce harmonic frequency components within electrical distribution bus 116). Second conversion device 212 determines a combined current command vector representative of the DC current demand vector and the first and second compensation vectors (to the extent that the volt-amperes required to produce the current represented by first and second compensation vectors does not exceed the excess volt-ampere capacity of charging device 104).

Second conversion device 212 performs a reverse d-q-n transformation on the combined current command vector to generate current command signals 231 for each phase of electrical distribution bus 116. Current command signals 231 are transmitted to power conditioning device 122 to produce a desired amount of DC current (based on the DC current demand vector) and a desired amount of compensation current at a desired phase angle (based on the first and second compensation vectors). Power conditioning device 122, as described more fully herein, uses active switching to supply the desired DC current to power storage device 106 and to supply the desired compensation current to electrical distribution bus 116 to compensate for, or to mitigate, volt-amperes reactive required as a result of inductive loads, such as second load 119, coupled to bus 116.

In one embodiment, controller 120 receives one or more compensation measurement signals 232 from power measurement device 118 (shown in FIG. 1) representative of the volt-amperes reactive flowing through electrical distribution bus 116, harmonic frequency components present within electrical distribution bus 116, and/or any other characteristic of electrical distribution bus 116 that enables charging device 104 to function as described herein. Accordingly, in such an embodiment, controller 120 performs a d-q-n transformation of compensation measurement signals 232 received from power measurement device 118, and second conversion device 212 receives one or more vectors (hereinafter referred to as "measured compensation vectors") representative of the transformed signals. Second conversion device 212 uses the measured compensation vectors in addition to, or instead of, the first and second compensation vectors to determine the combined current command vector.

Figure 3:
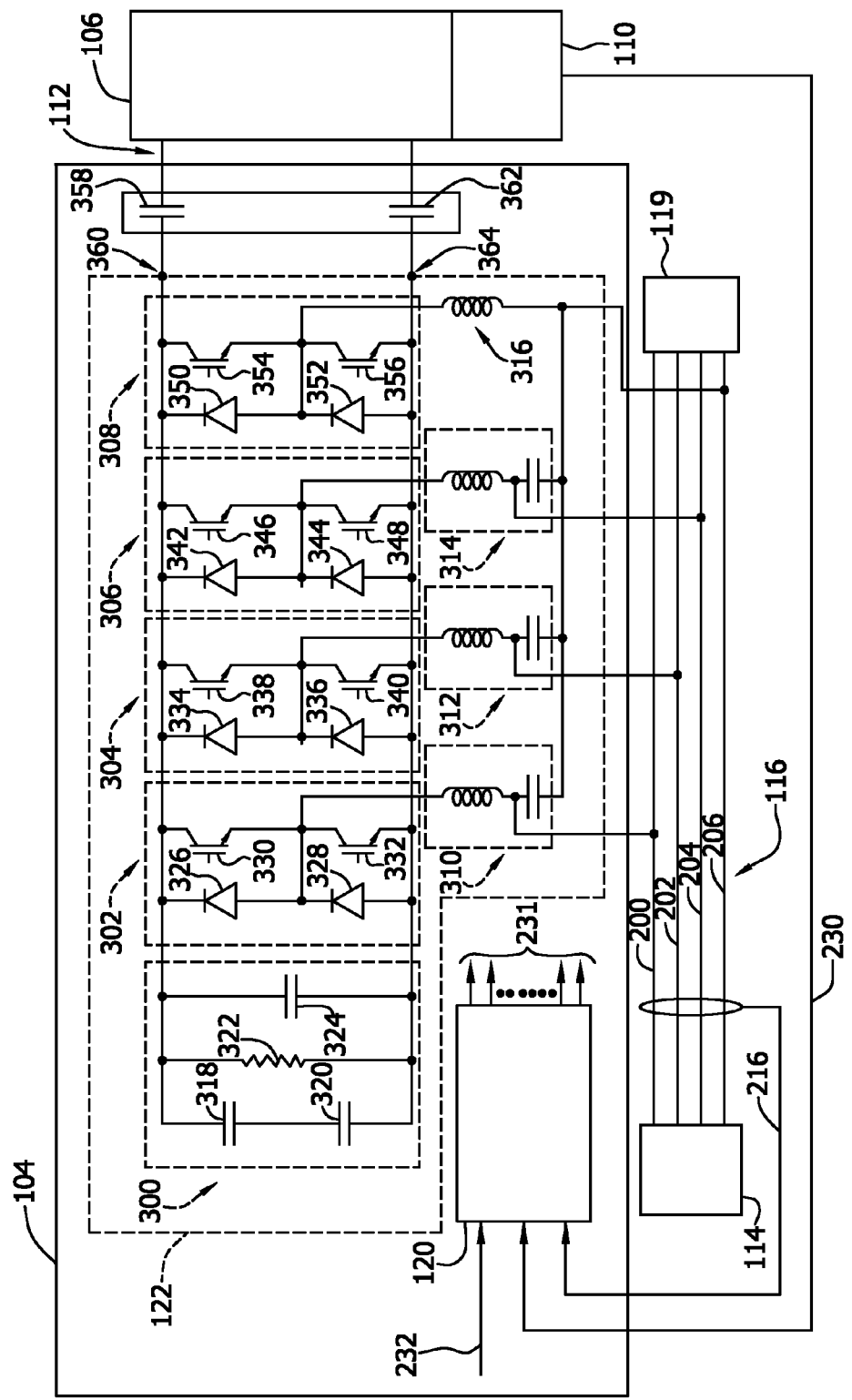
FIG. 3 is a schematic diagram of an exemplary power conditioning device that may be used with the system shown in FIG. 1.

FIG. 3 is a schematic diagram of an exemplary power conditioning device 122 that may be used with system 100 (shown in FIG. 1). In an exemplary embodiment, power conditioning device 122 includes a DC bus 300, a first switching circuit 302, a second switching circuit 304, a third switching circuit 306, and a fourth switching circuit 308. In an exemplary embodiment, first switching circuit 302 is coupled to first phase conductor 200 by a first filter 310, second switching circuit 304 is coupled to second phase conductor 202 by a second filter 312, third switching circuit 306 is coupled to third phase conductor 204 by a third filter 314, and fourth switching circuit 308 is coupled to neutral conductor 206 by a fourth filter 316.

In an exemplary embodiment, DC bus 300 includes a first capacitor 318 and a second capacitor 320 coupled together in series. A discharge resistor 322 is coupled in parallel with first capacitor 318 and second capacitor 320, and a clamping capacitor 324 coupled in parallel with discharge resistor 322. Alternatively, any suitable number of capacitors and/or any other configuration of DC bus 300 may be used that enables power conditioning device 122 to function as described herein.

First switching circuit 302 includes a first diode 326 coupled in series with a second diode 328 and a first switching device 330 coupled in series with a second switching device 332. First and second switching devices 330 and 332 are coupled in series with first and second diodes 326 and 328. A junction of first diode 326 and second diode 328 is coupled to a junction of first switching device 330 and second switching device 332, and the junctions are coupled to first filter 310.

Second switching circuit 304 includes a third diode 334 coupled in series with a fourth diode 336 and a third switching device 338 coupled in series with a fourth switching device 340. Third and fourth switching devices 338 and 340 are coupled in series with third and fourth diodes 334 and 336. A junction of third diode 334 and fourth diode 336 is coupled to a junction of third switching device 338 and fourth switching device 340, and the junctions are coupled to second filter 312.

Similarly, third switching circuit 306 includes a fifth diode 342 coupled in series with a sixth diode 344 and a fifth switching device 346 coupled in series with a sixth switching device 348. Fifth and sixth switching devices 346 and 348 are coupled in series with fifth and sixth diodes 342 and 344. A junction of fifth diode 342 and sixth diode 344 is coupled to a junction of fifth switching device 346 and sixth switching device 348, and the junctions are coupled to third filter 314.

Fourth switching circuit 308 includes a seventh diode 350 coupled in series with an eighth diode 352 and a seventh switching device 354 coupled in series with an eighth switching device 356. Seventh and eighth switching devices 354 and 356 are coupled in series with seventh and eighth diodes 350 and 352. A junction of seventh diode 350 and eighth diode 352 is coupled to a junction of seventh switching device 354 and eighth switching device 356, and the junctions are coupled to fourth filter 316.

In an exemplary embodiment, each switching device within first switching circuit 302, second switching circuit 304, third switching circuit 306, and fourth switching circuit 308 is an insulated gate bipolar transistor (IGBT). Alternatively, one or more switching devices may be any other transistor or device that enables power conditioning device 122 to function as described herein.

A first contactor 358 is coupled to a first, or positive, terminal 360 of power conditioning device 122 and a second contactor 362 is coupled to a second, or negative, terminal 364 of power conditioning device 122. First contactor 358 and second contactor 362 are selectively activated by a controller, such as controller 120, to electrically connect power conditioning device 122 to power conduit 112 and to electrically disconnect power conditioning device 122 from power conduit 112. When first contactor 358 and second contactor 362 are closed, power conduit 112 receives DC current from DC bus 300, first switching circuit 302, second switching circuit 304, third switching circuit 306, and/or fourth switching circuit 308, and provides the DC current to power storage device 106 for use in charging power storage device 106.

In an exemplary embodiment, controller 120 controls a switching operation of each switching device within first switching circuit 302, second switching circuit 304, third switching circuit 306, and fourth switching circuit 308 such that circuits 302, 304, 306, and 308 are "actively" switched. As used herein, the terms "switching" or "switching operation" refer to selectively operating a device in an "on" state (i.e., an electrically conductive state) and an "off" state (i.e., an electrically non-conductive state) based on control signals received by the device. In an exemplary embodiment, controller 120 receives DC demand signal 230 from vehicle controller 110 and a current signal 216 from each of first phase conductor 200, second phase conductor 202, third phase conductor 204, and neutral conductor 206. Controller 120 determines an amount of volt-amperes reactive flowing through electrical distribution bus 116 and/or an amount of harmonic frequency components within electrical distribution bus 116 from current signals 216, as described more fully above with reference to FIG. 2. Alternatively or additionally, controller 120 receives one or more compensation measurement signals 232 from power measurement device 118 and uses compensation measurement signals 232 to determine the amount of volt-amperes reactive flowing through electrical distribution bus 116.

In an exemplary embodiment, controller 120 determines current command signals 231 from DC demand signal 230, current signals 216, and/or compensation measurement signals 232, as described above with reference to FIG. 2. Controller 120 transmits current command signals 231 to first switching device 330, second switching device 332, third switching device 338, fourth switching device 340, fifth switching device 346, sixth switching device 348, seventh switching device 354, and eighth switching device 356 to control the switching operation thereof. Accordingly, compensating currents are generated by first switching circuit 302, second switching circuit 304, third switching circuit 306 and/or fourth switching circuit 308. The compensating currents are filtered by first filter 310, second filter 312, third filter 314, and fourth filter 316, and are provided to electrical distribution bus 116 to generate volt-amperes reactive within bus 116.

FIG. 4 is a flow diagram of an exemplary method 400 of supplying power to at least one load. In an exemplary embodiment, method 400 is used with system 100 (shown in FIG. 1) and is at least partially executed by controller 120 of charging device 104 (both shown in FIG. 1).

In an exemplary embodiment, charging device 104 receives 402 alternating current (AC) volt-amperes from electric power source 114 through electrical distribution bus 116. In addition, charging device 104 receives 404 a request representative of an amount of current to be supplied to a load, such as power storage device 106 of electric vehicle 102. In one embodiment, the request is embodied within DC demand signal 230 (shown in FIG. 2).

Controller 120 determines 406 a maximum volt-ampere capacity of charging device 104, i.e., a maximum amount of volt-amperes that charging device 104 is configured to deliver. Controller 120 operates power conditioning device 122 to convert 408 a first amount of the AC volt-amperes received into DC power. More specifically, if an amount of volt-amperes required to supply the requested current (hereinafter the "requested DC power") is less than or equal to the maximum volt-ampere capacity of charging device 104, power conditioning device 122 converts 408 the requested DC power and supplies 410 the DC power to the load. If the requested DC power is greater than the maximum volt-ampere capacity of charging device 104, power conditioning device 122 converts 408 an amount of power equal to the maximum volt-ampere capacity and supplies 410 the converted DC power to the load.

In an exemplary embodiment, controller 120 determines 412 a second, or excess, amount of volt-amperes that charging device 104 is configured to supply, or has a capacity to supply, in addition to the DC power supplied 410. More specifically, controller 120 determines 412 the excess amount of volt-amperes by subtracting the DC power supplied 410 from the maximum amount of volt-amperes that is enabled to be supplied by charging device 104. Further, controller 120 determines 414 an amount of volt-amperes reactive flowing to at least one electrical device coupled to electrical distribution bus 116. In one embodiment, controller 120 determines 414 the volt-amperes reactive flowing based on current signals 216 (shown in FIG. 2) and/or measurements received from current and/or voltage sensors coupled to and/or coupled proximate to electrical distribution bus 116. In another embodiment, controller 120 determines 414 the volt-amperes reactive flowing based on compensation measurement signals 232 received from power measurement device 118.

In an exemplary embodiment, controller 120 controls power conditioning device 122 to supply 416 volt-amperes reactive to electrical distribution bus 116 using at least a portion of the second, or excess, amount of volt-amperes. More specifically, power conditioning device 122 supplies 416 volt-amperes reactive to electrical distribution bus 116 at an amount equal to the lesser of the excess amount of power and the amount of volt-amperes reactive required. As such, power conditioning device 122 uses at least a portion of the excess amount of volt-amperes to compensate for the volt-amperes reactive required within system 100.

While the embodiments have been described herein with reference to an electric vehicle, charging device 104 may be used with any other suitable load. For example, charging device 104 may provide DC power to one or more servers within a data center and/or any other DC load in an amount requested by the servers and/or DC load, and may use excess volt-amperes capacity to supply volt-amperes reactive to electrical distribution bus 116.

As described herein, a robust and effective charging device is provided. The charging device includes a power conditioning device coupled to a power storage device of an electric vehicle. The power conditioning device receives AC volt-amperes from an electric power source through an electrical distribution bus. The power conditioning device converts the AC volt-amperes to DC power and supplies a requested amount of DC power to the power storage device. If the amount of DC power requested exceeds a maximum volt-ampere capacity of the charging device, the power conditioning device provides DC power in an amount up to the maximum power capacity. In addition, a controller is coupled to the power conditioning device. If the controller determines that an excess amount of volt-amperes may be provided by the power conditioning device (i.e., if the DC power provided is less than the maximum volt-ampere capacity), the controller operates the power conditioning device to provide volt-amperes reactive to the electrical distribution bus. The controller determines, or receives measurements representative of, an amount of volt-amperes reactive required by one or more devices coupled to the electrical distribution bus. Controller operates the power conditioning device to provide volt-amperes reactive to the electrical distribution bus in an amount equal to the lesser of the excess amount of volt-amperes and the amount of volt-amperes reactive flowing through the electrical distribution bus. Accordingly, the charging device described herein enables excess volt-ampere capacity to be used to offset or compensate for volt-amperes reactive required within the electrical distribution bus. As such, the charging device may facilitate maintaining a unity power factor within the electrical distribution bus.

A technical effect of the devices and methods described herein includes at least one of (a) receiving alternating current (AC) volt-amperes from an electric power source through an electrical distribution bus; (b) converting a first amount of AC volt-amperes received into direct current (DC) power; (c) supplying DC power to at least one load; (d) determining a second amount of volt-amperes that is capable of being supplied in addition to the DC power supplied; and (e) supplying volt-amperes reactive to an electrical distribution bus using at least a portion of the second amount of volt-amperes.

Exemplary embodiments of a charging device, a system, and a method of supplying power to at least one load are described above in detail. The charging device, system, and method are not limited to the specific embodiments described herein, but rather, components of the charging device and/or system and/or steps of the method may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging device comprising:
a power conditioning device configured to be coupled to a three phase electric power source by an electrical distribution bus, said power conditioning device further configured to receive alternating current (AC) volt-amperes from the three phase electric power source, said power conditioning device having a volt-amperes capacity; and
a controller coupled to said power conditioning device, said controller configured to:
determine, using a d-q-n transformation, a first amount of the volt-amperes capacity to be converted to direct current (DC) power by said power conditioning device;
control said power conditioning device to convert the first amount of the volt-amperes capacity to DC power and to supply the DC power to at least one load when the first amount is greater than zero;
determine, using a d-q-n transformation, a second amount of the volt-amperes capacity, wherein the second amount is a difference between the volt-amperes capacity and the first amount; and
control said power conditioning device to supply volt-amperes reactive to the electrical distribution bus using at least a portion of the second amount of the volt-amperes capacity when the second amount is greater than zero.

2. A charging device in accordance with claim 1, wherein the at least one load is a power storage device of an electric vehicle, said power conditioning device is configured to supply DC power to the power storage device in an amount requested by the electric vehicle.

3. A charging device in accordance with claim 1, wherein said controller is configured to determine the second amount of the volt-amperes capacity by subtracting the amount of DC power supplied from the volt-amperes.

4. A charging device in accordance with claim 1, wherein said controller is configured to determine an amount of volt-amperes reactive required by at least one electrical device coupled to the electrical distribution bus.

5. A charging device in accordance with claim 4, wherein said controller is configured to control said power conditioning device to use at least a portion of the second amount of the volt-amperes capacity to supply volt-amperes reactive to the electrical distribution bus to compensate for the volt-amperes reactive required.

6. A charging device in accordance with claim 4, wherein said controller is configured to control said power conditioning device to supply volt-amperes reactive to the electrical distribution bus at an amount equal to the lesser of the second amount of the volt-amperes capacity and the amount of volt-amperes reactive required.

7. A charging device in accordance with claim 1, wherein said power conditioning device comprises a plurality of switching devices configured to convert AC volt-amperes to DC power and to supply volt-amperes reactive to the electrical distribution bus.

8. A system for supplying power to at least one load, said system comprising:
a power measurement device configured to measure at least one characteristic of electricity transmitted within an electrical distribution bus;
a charging device coupled to said power measurement device, said charging device comprising:
a power conditioning device configured to be coupled to a three phase electric power source by the electrical distribution bus, said power conditioning device further configured to receive alternating current (AC) volt-amperes from the three phase electric power source, said power conditioning device having a volt-amperes capacity; and
a controller coupled to said power conditioning device, said controller configured to:
determine, using a d-q-n transformation, a first amount of the volt-amperes capacity to be converted to direct current (DC) power by said power conditioning device;
control said power conditioning device to convert the first amount of the volt-amperes capacity to DC power and to supply the DC power to at least one load when the first amount is greater than zero;
determine, using a d-q-n transformation, a second amount of the volt-amperes capacity, wherein the second amount is a difference between the volt-amperes capacity and the first amount; and
control said power conditioning device to supply volt-amperes reactive to the electrical distribution bus using at least a portion of the second amount of the volt-amperes capacity when the second amount is greater than zero.

9. A system in accordance with claim 8, wherein the at least one load is a power storage device of an electric vehicle, said power conditioning device is configured to supply DC power to the power storage device in an amount requested by the electric vehicle.

10. A system in accordance with claim 8, wherein said controller is configured to determine the second amount of the volt-amperes capacity by subtracting the amount of DC power supplied from the volt-amperes capacity.

11. A system in accordance with claim 8, wherein said power measurement device is configured to determine an amount of volt-amperes reactive required by at least one electrical device coupled to the electrical distribution bus and transmit data representative of the amount of volt-amperes reactive required to said controller.

12. A system in accordance with claim 11, wherein said controller is configured to control said power conditioning device to use at least a portion of the second amount of the volt-amperes capacity to supply volt-amperes reactive to the electrical distribution bus to compensate for the volt-amperes reactive required.

13. A system in accordance with claim 11, wherein said controller is configured to control said power conditioning device to supply volt-amperes reactive to the electrical distribution bus at an amount equal to the lesser of the second amount of the volt-amperes capacity and the amount of volt-amperes reactive required.

14. A system in accordance with claim 8, wherein said power conditioning device comprises a plurality of switching devices configured to convert AC volt-amperes to DC power and to supply volt-amperes reactive to the electrical distribution bus.

15. A method of supplying power to at least one load, said method comprising:
receiving alternating current (AC) volt-amperes from a three phase electric power source through an electrical distribution bus;
determining, using a d-q-n transformation, a first amount of the AC volt-amperes to be supplied to at least one load;
converting the first amount of the AC volt-amperes received into direct current (DC) power when the first amount is greater than zero;
supplying the DC power to the at least one load when the first amount is greater than zero;
determining, using a d-q-n transformation, a second amount of volt-amperes, wherein the second amount is a difference between a maximum volt-amperes capacity and the first amount; and
supplying volt-amperes reactive to the electrical distribution bus using at least a portion of the second amount of volt-amperes when the second amount of volt-amperes is greater than zero.

16. A method in accordance with claim 15, wherein the at least one load is a power storage device of an electric vehicle, said supplying DC power to at least one load comprises supplying DC power to the power storage device in an amount requested by the electric vehicle.

17. A method in accordance with claim 15, wherein said determining the second amount of volt-amperes that is capable of being supplied comprises subtracting the amount of DC power supplied from the maximum volt-amperes capacity.

18. A method in accordance with claim 15, further comprising determining an amount of volt-amperes reactive required by at least one electrical device coupled to the electrical distribution bus.

19. A method in accordance with claim 18, wherein said supplying volt-amperes reactive to the electrical distribution bus using at least a portion of the second amount of volt-amperes comprises supplying volt-amperes reactive to the electrical distribution bus at an amount equal to the lesser of the second amount of volt-amperes and the amount of volt-amperes reactive required.

* * * * *